United States Patent
Livni et al.

(10) Patent No.: US 10,301,728 B2
(45) Date of Patent: May 28, 2019

(54) SYSTEM FOR THE ELECTROLYSIS OF WATER HAVING ROTATING DISC CATHODES AND AN AUTOMATED CATHODE CLEANER

(71) Applicant: C.Q.M. LTD, Kibbutz Givat Hashlosha (IL)

(72) Inventors: Zvi Livni, Tel Aviv (IL); Motti Karin, Hod HaSharon (IL); Omer Livni, Hod HaSharon (IL); Udi Siboni, Kfar Saba (IL)

(73) Assignee: C.Q.M. LTD, Kibbutz Givat Hashlosha (IL)

( * ) Notice: Subject to any disclaimer, the term of this patent is extended or adjusted under 35 U.S.C. 154(b) by 217 days.

(21) Appl. No.: 14/893,068

(22) PCT Filed: May 22, 2014

(86) PCT No.: PCT/IL2014/050459
§ 371 (c)(1),
(2) Date: Nov. 22, 2015

(87) PCT Pub. No.: WO2014/188432
PCT Pub. Date: Nov. 27, 2014

(65) Prior Publication Data
US 2016/0090656 A1    Mar. 31, 2016

Related U.S. Application Data

(60) Provisional application No. 61/826,028, filed on May 22, 2013.

(51) Int. Cl.
*C25B 15/00*    (2006.01)
*C02F 1/46*    (2006.01)
(Continued)

(52) U.S. Cl.
CPC ............ *C25B 15/00* (2013.01); *C02F 1/4602* (2013.01); *C02F 1/46109* (2013.01);
(Continued)

(58) Field of Classification Search
CPC .... C25B 1/13; C25B 1/26; C25B 1/30; C25B 9/125; C25B 15/00; C02F 1/4602; C02F 1/46109; C02F 2001/46123
See application file for complete search history.

(56) References Cited

U.S. PATENT DOCUMENTS 3,006,826 A * 10/1961 Roller ................. C02F 1/46109
                                                        204/227
3,432,420 A * 3/1969 Pan ......................... C25B 9/12
                                                        204/216
(Continued)

FOREIGN PATENT DOCUMENTS

CN    201169550 Y    12/2008
CN    202508932 U    10/2012
(Continued)

OTHER PUBLICATIONS

Machine Translation utilized by Examiner for Applicant Provided DE 32 03 090. (Year: 1983).*

*Primary Examiner* — Ciel P Thomas
(74) *Attorney, Agent, or Firm* — Mark M. Friedman (57) ABSTRACT

An electrolysis mechanism for deployment in a reservoir of water, the electrolysis system having at least one rotating cathode mounted on an axle and configured to rotate during an electrolysis process, at least one stationary cathode cleaning element deployed so as to contact a face of the rotating cathode such that during the electrolysis process as the rotating cathode, rotates scale buildup on the rotating cathode is removed and at least one stationary anode deployed adjacent to the rotating cathode. A preferred embodiment of which includes a plurality of spaced apart rotating cathodes;
(Continued)

a plurality of stationary cathode cleaning elements with one stationary cathode cleaning element deployed in each space between the rotating cathodes so as to contact a face of each of the rotating cathodes it is deployed between; and a plurality of stationary anodes such that at least one of stationary anode is deployed in each of the spaces between the rotating cathodes.

9 Claims, 9 Drawing Sheets

(51) Int. Cl.
    *C25B 9/12*     (2006.01)
    *C25B 1/26*     (2006.01)
    *C25B 1/13*     (2006.01)
    *C25B 1/30*     (2006.01)
    *C02F 1/461*     (2006.01)

(52) U.S. Cl.
    CPC .... *C25B 9/125* (2013.01); *C02F 2001/46123* (2013.01); *C25B 1/13* (2013.01); *C25B 1/26* (2013.01); *C25B 1/30* (2013.01)

(56) References Cited

U.S. PATENT DOCUMENTS

| | | | | |
|---|---|---|---|---|
| 3,666,561 | A | | 5/1972 | Chiku |
| 3,822,017 | A | * | 7/1974 | Rast .................... C02F 1/46109 |
| | | | | 204/212 |
| 3,825,484 | A | * | 7/1974 | Fronsman et al. ........ C23F 1/46 |
| | | | | 204/212 |
| 4,444,637 | A | | 4/1984 | King |
| 5,587,064 | A | * | 12/1996 | Hambitzer ............ C02F 1/4678 |
| | | | | 204/217 |
| 6,355,155 | B1 | * | 3/2002 | DeWaart ............... B01D 1/2856 |
| | | | | 204/212 |
| 2010/0122912 | A1 | * | 5/2010 | Resor .................... C02F 1/4602 |
| | | | | 205/742 |
| 2011/0000790 | A1 | | 1/2011 | Wood et al. |
| 2011/0017066 | A1 | | 1/2011 | Takeuchi et al. |

FOREIGN PATENT DOCUMENTS

| | | |
|---|---|---|
| DE | 3203090 A1 | 8/1983 |
| KR | 100874273 B1 | 12/2008 |

\* cited by examiner

SYSTEM FOR THE ELECTROLYSIS OF WATER HAVING ROTATING DISC CATHODES AND AN AUTOMATED CATHODE CLEANER

FIELD AND BACKGROUND OF THE INVENTION

The present invention relates to devices used in the electrolysis of water and, in particular, it concerns a system for the electrolysis of water having rotating disc cathodes and an automated cathode cleaner.

The system of the present invention is particularly well suited for use with a water purification and disinfection system for treating water in a substantially closed circulating water system that uses electrolysis to produce free chlorine and other oxidants such as, but not limited to ozone ($O_3$) and hydrogen peroxide ($H_2O_2$), in which all of the water in the system is exposed to the electrolysis process.

SUMMARY OF THE INVENTION

The present invention is a system for the electrolysis of water having rotating disc cathodes and an automated cathode cleaner.

According to the teachings of the present invention there is provided, an electrolysis mechanism for deployment in a reservoir of water, the electrolysis system comprising: (a) at least one rotating cathode mounted on an axle and configured to rotate during an electrolysis process; (b) at least one stationary cathode cleaning element deployed so as to contact a face of the rotating cathode such that during the electrolysis process as the rotating cathode rotates scale buildup on the rotating cathode is removed; and (c) at least one stationary anode deployed adjacent to the rotating cathode.

According to the teachings of the present invention: (a) the at least one rotating cathodes is configured as a plurality of spaced apart rotating cathodes; (b) the at least one stationary cathode cleaning element is configured as a plurality of stationary cathode cleaning elements equal in number to the number of spaces between the rotating cathodes such that one of stationary cathode cleaning element is deployed in each of the spaces between the rotating cathodes so as to contact a face of each of the rotating cathodes the one stationary cathode cleaning element is deployed between; and (c) the at least one stationary anode is configured as a plurality of stationary anodes at least equal in number to the number of the spaces between the rotating cathodes such that one of stationary anodes is deployed in each of the spaces between the rotating cathodes.

According to the teachings of the present invention the stationary cathode cleaning element is deployed so as to extend from a point adjacent to the axle to at least an edge of the rotating cathode.

According to the teachings of the present invention the stationary cathode cleaning element is configured as one from a list that includes: substantially soft, substantially abrasive and a scraping element.

According to the teachings of the present invention the scraping element is configured with scraping edges and is outwardly biased such that the scraping edges contact the face of each of the rotating cathodes the scraping element is deployed between.

According to the teachings of the present invention the rotating cathode is configured substantially as a disc.

There is also provided according to the teaching of the present invention a method for automated cathode cleaning in an electrolysis system having at least one rotating cathode and at least one stationary anode, the method comprising: (a) deploying at least one stationary cathode cleaning element so as to contact a face of the rotating cathode; (b) operating the electrolysis system thereby causing the rotating cathode to rotate while performing an electrolysis process; (c) removing scale buildup on the rotating cathode by means of said stationary cathode cleaning element as the rotating cathode rotates.

According to the teachings of the present invention the at least one rotating cathodes is implemented as a plurality of spaced apart rotating cathodes and the at least one stationary anode in implemented as a plurality of stationary anodes, such that the deploying at least one stationary cathode cleaning element is implemented as deploying a plurality of stationary cathode cleaning elements equal in number to the number of spaces between the rotating cathodes such that one of stationary cathode cleaning element is deployed in each of the spaces between the rotating cathodes so as to contact a face of each of the rotating cathodes the one stationary cathode cleaning element is deployed between.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a system for the electrolysis of water having rotating disc cathodes and an automated cathode cleaner according to the present invention may be better understood with reference to the drawings and the accompanying description.

Figure 1:
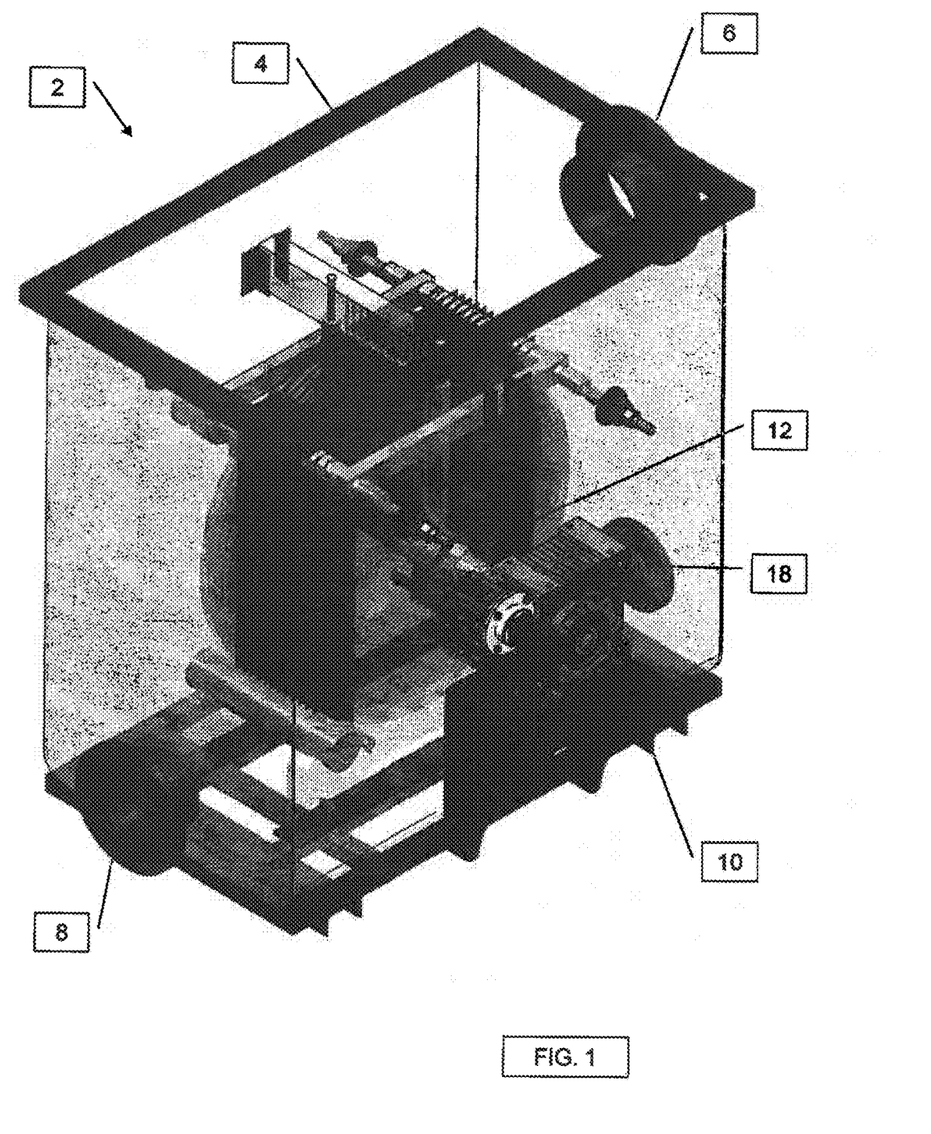
FIG. 1 is transparent isometric view of a first preferred embodiment of a system for the electrolysis of water constructed and operational according to the teaching of the present invention.
Figure 2:
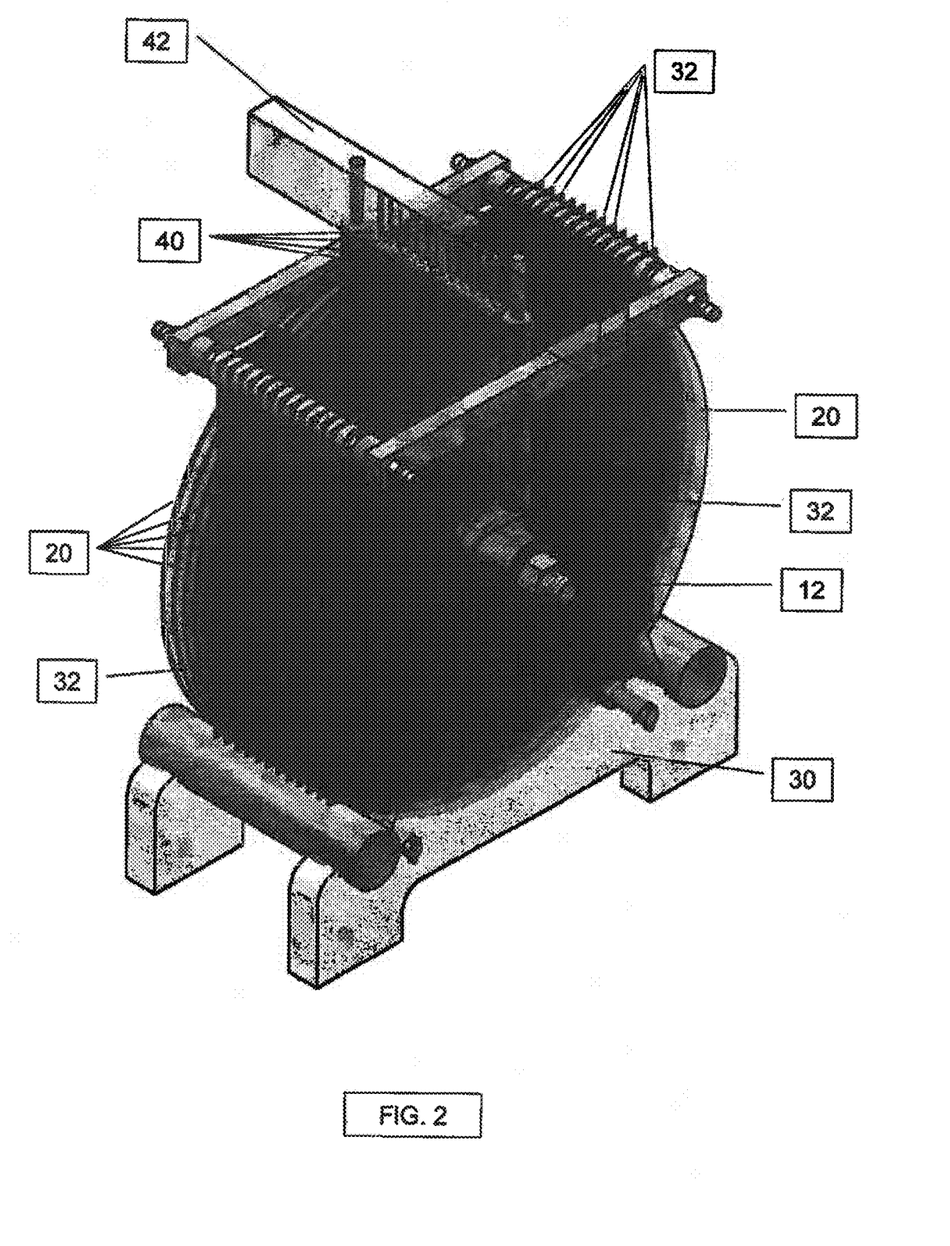
FIG. 2 is transparent isometric view of the electrolysis mechanism of the embodiment of FIG. 1.
Figure 3:
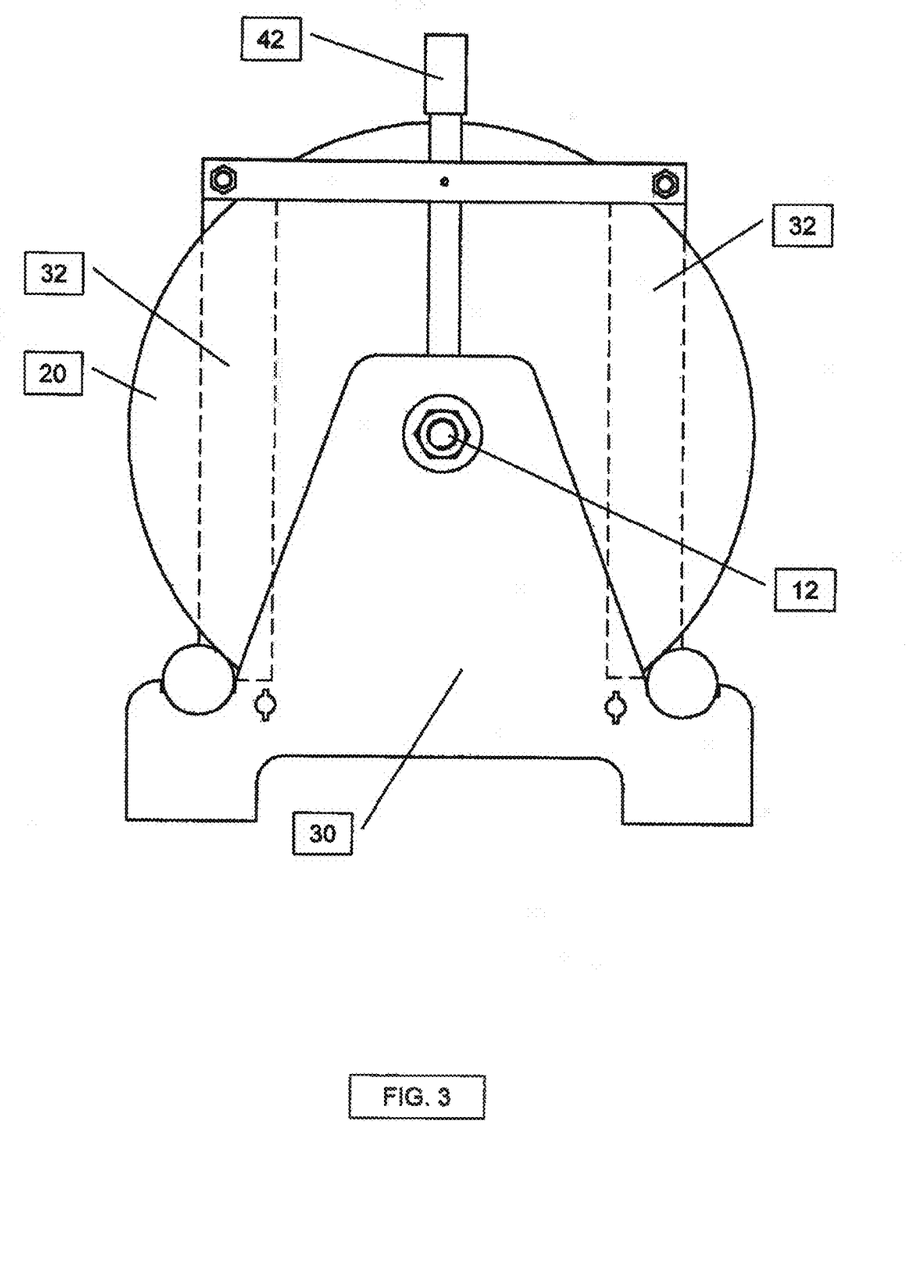
FIG. 3 is a side elevation of the electrolysis mechanism of the embodiment of FIG. 2.
Figure 4:
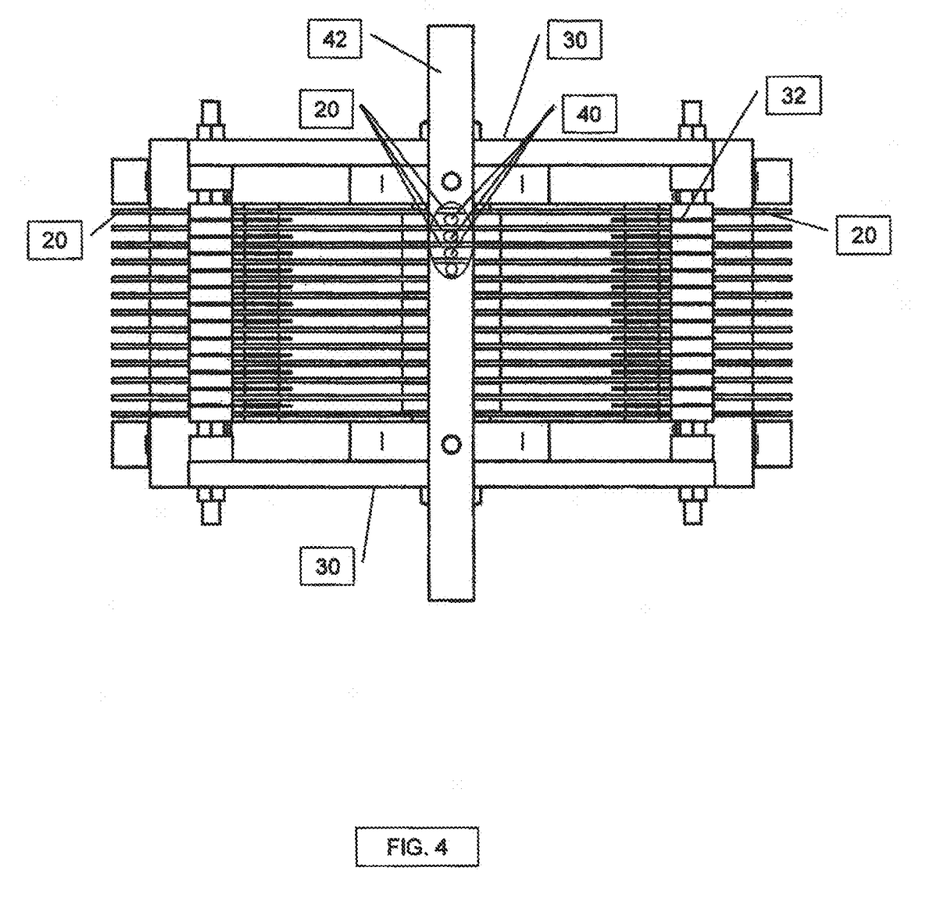
FIG. 4 is a top elevation of the electrolysis mechanism of the embodiment of FIG. 2.
Figure 5:
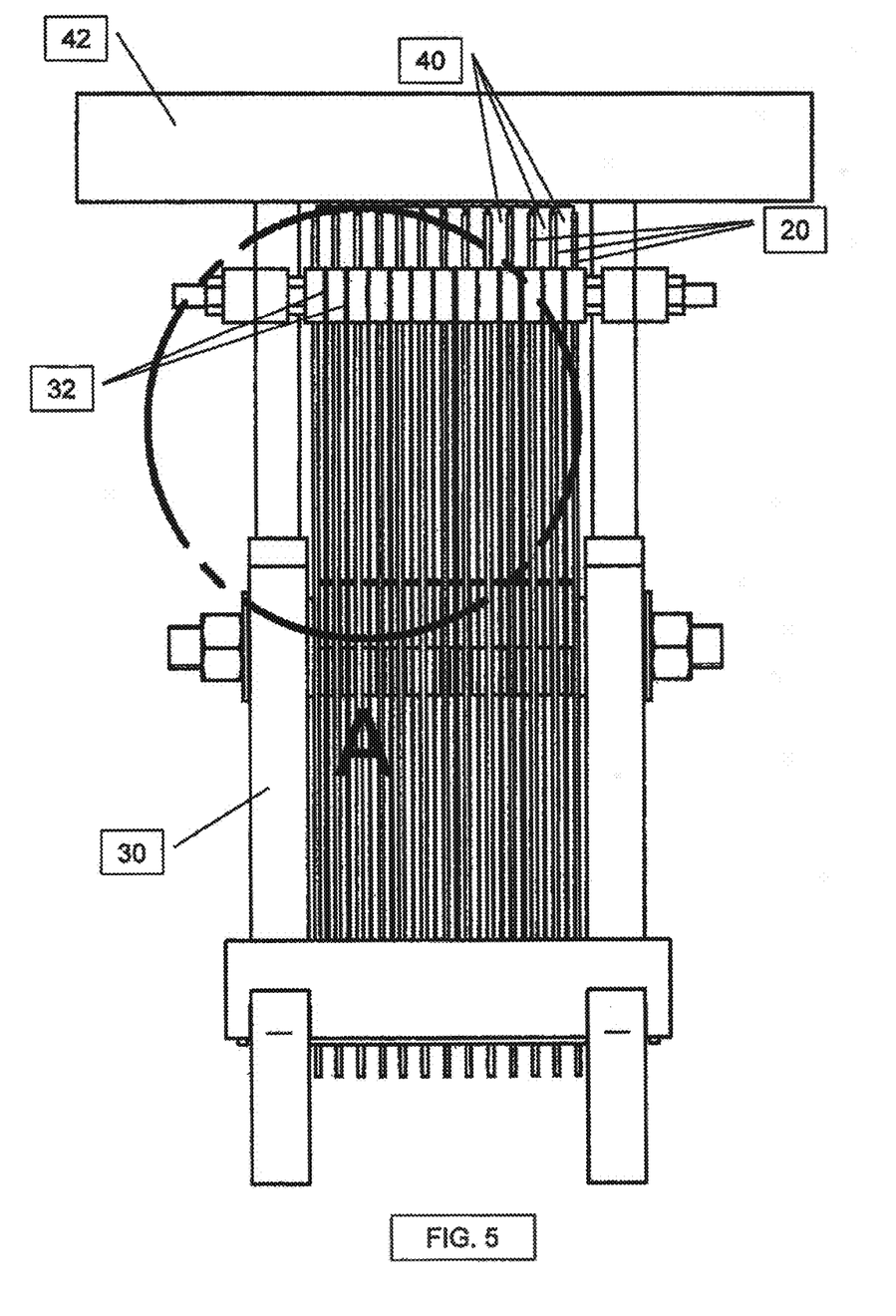
FIG. 5 is a end elevation of the electrolysis mechanism of the embodiment of FIG. 2.
Figure 6:
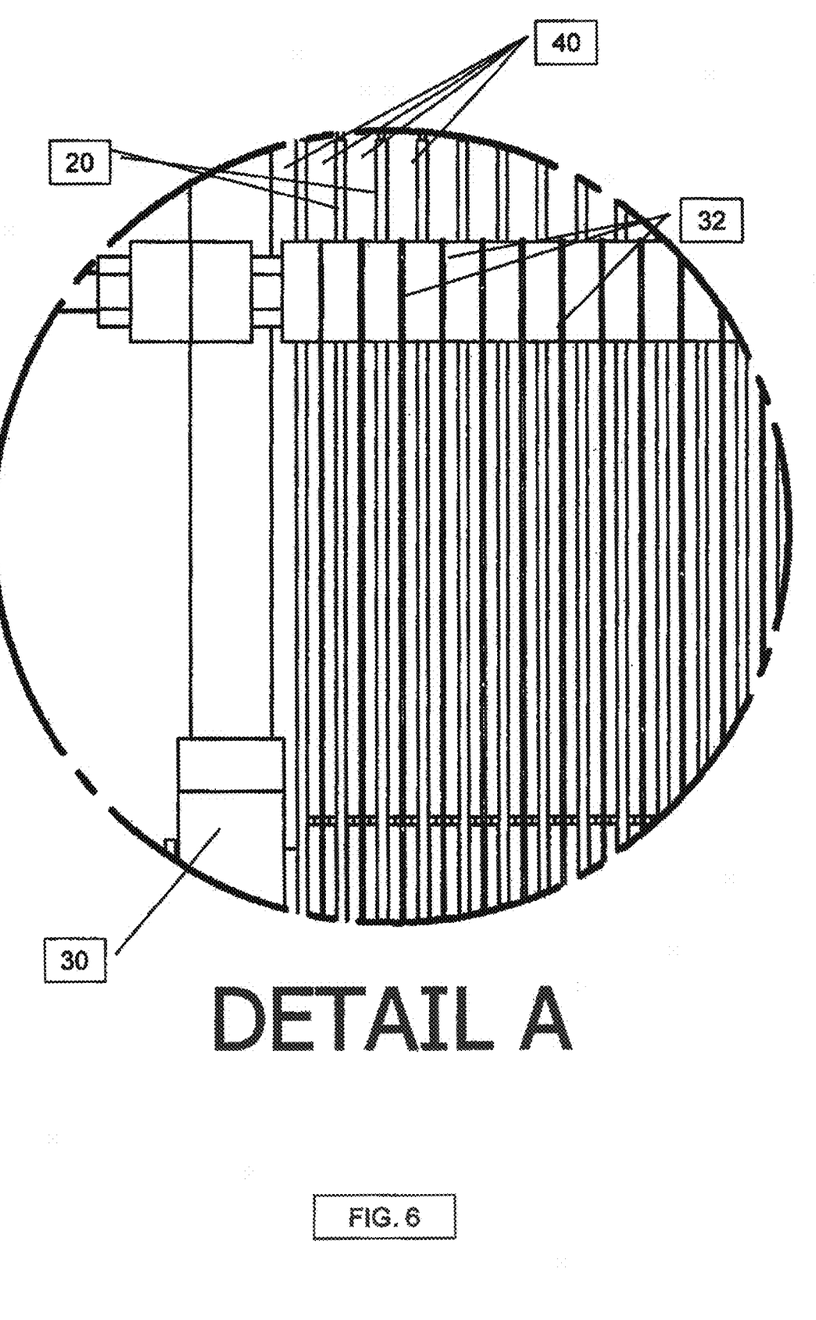
FIG. 6 is detail A of FIG. 5.

FIG. 1 illustrates a first preferred embodiment 2 of a system for the electrolysis of water constructed and operational according to the teaching of the present invention. As is common in such systems, the tank 4 is configured with an inlet 6 and an outlet 8. It will be appreciated that the electrolysis system of the present invention by be deployed in substantially any container or reservoir for the containment of water.

What is not common to such systems is the drive mechanism 10, illustrated here as a gear reduction assembly configured for attachment to a drive motor not shown.

Looking now at FIGS. 2-6, attached to the axle 12 extending from the drive mechanism 10 into the tank 4 is at least one, here illustrated as a plurality, disc shaped rotating cathode 20. Attached to the stationary frame 30 is at least one, here illustrated as a plurality, anode 32. Thusly configured, the electrons pass from the rotating cathodes 20 to the adjacent anodes 32 as the rotating cathodes rotate on the axle 12.

It will be appreciated that the circumference, and thereby the surface area of the face, of the rotating cathode discs 20 and the surface area of the anodes 32 may be varied as necessary depending on the needs of the particular system at hand. It will also be readily understood that while the Figures herein illustrate anodes 32 as a pair of anodes deployed symmetrically on either side of the axle 12, this is for illustrative purposes of a preferred embodiment only and not to be interpreted as a limitation as to the configuration and/of deployment of the anodes and their relationship to the rotating cathodes. For example, an embodiment that includes anodes only on the right side of the axle is within the scope of the present invention.

As is common with systems for the electrolysis of water, unwanted scale builds up on the surface of the cathodes. Current systems of the art attempt to solve this problem by constructing the electrodes, the "cathodes" and the "anodes", of the same material and intermittently switching the polarity of the system such that the cathodes become anodes and the anodes become cathodes and the change is repeated. There are several drawbacks, chief amount them being the cost. Since the most efficient material for cathodes is platinum or platinum alloys both electrodes must be constructed of the expensive material. Further, the cost of the electrical switches used to reverse the polarity of the system can be very expensive especially in large high power systems.

Another drawback is that while the scale builds up at a slower rate, there is still a buildup of scale over time on both electrodes that must be cleaned by shutting down the system. Such routine maintenance is also a financial and time loss.

The system of the present invention solves these problems by deploying stationary cathode cleaning elements 40 that are in contact with the rotating cathode discs 20 and substantially remove any scale while the system is operational and the electrolysis process is ongoing. As illustrated herein, the stationary cathode cleaning element is preferably, but not necessarily, deployed so as to extend from a frame element illustrated here as frame cross-bar element 42 to a point adjacent to the axle so as to span at least the distance substantially from to the axle to the edge of the rotating cathode disc.

It will be appreciated that the cleaning elements may be fabricated from substantially any suitable material ranging from substantially soft material such as sponge (natural or synthetic) to abrasive material such as Scotch-Brite™ or steel wool for example. Alternatively, the cathode cleaning element may be configured as a scraping element such as a hard blade (see FIGS. 7-9).

Therefore, in a system of the present invention having a plurality of rotating cathodes the cathodes are configured as a plurality of spaced apart rotating cathodes. The stationary cathode cleaning elements are configured as a plurality of stationary cathode cleaning elements equal in number to the number of spaces between the rotating cathodes such that one of stationary cathode cleaning element is deployed in each of the spaces between the rotating cathodes so as to contact a face of each of the rotating cathodes the stationary cathode cleaning element is deployed between. Likewise, the stationary anodes are configured as a plurality of stationary anodes equal in number to the number of the spaces between the rotating cathodes such that one of stationary anodes is deployed in each of the spaces between the rotating cathodes.

It will be appreciated that the scale that accumulates at the bottom of tank 4 may be removed by draining and flushing the tank via outlet 18 for example.

Since the rotating cathodes discs 20 are kept substantially scale free, there is no need to reverse the polarity of the system, the rotating cathodes 20 may remain cathodes and the stationary anodes 32 may remain anodes. Therefore, only the rotating cathodes 20 need be constructed of the more expensive material such as, but not limited to, platinum, for example. The anode 32 may be constructed of lesser expensive material such as, but not limited to, stainless steel, for example.

The fact that there is no need to switch the polarity of the system also eliminates the need for expensive switches.

Figure 7:
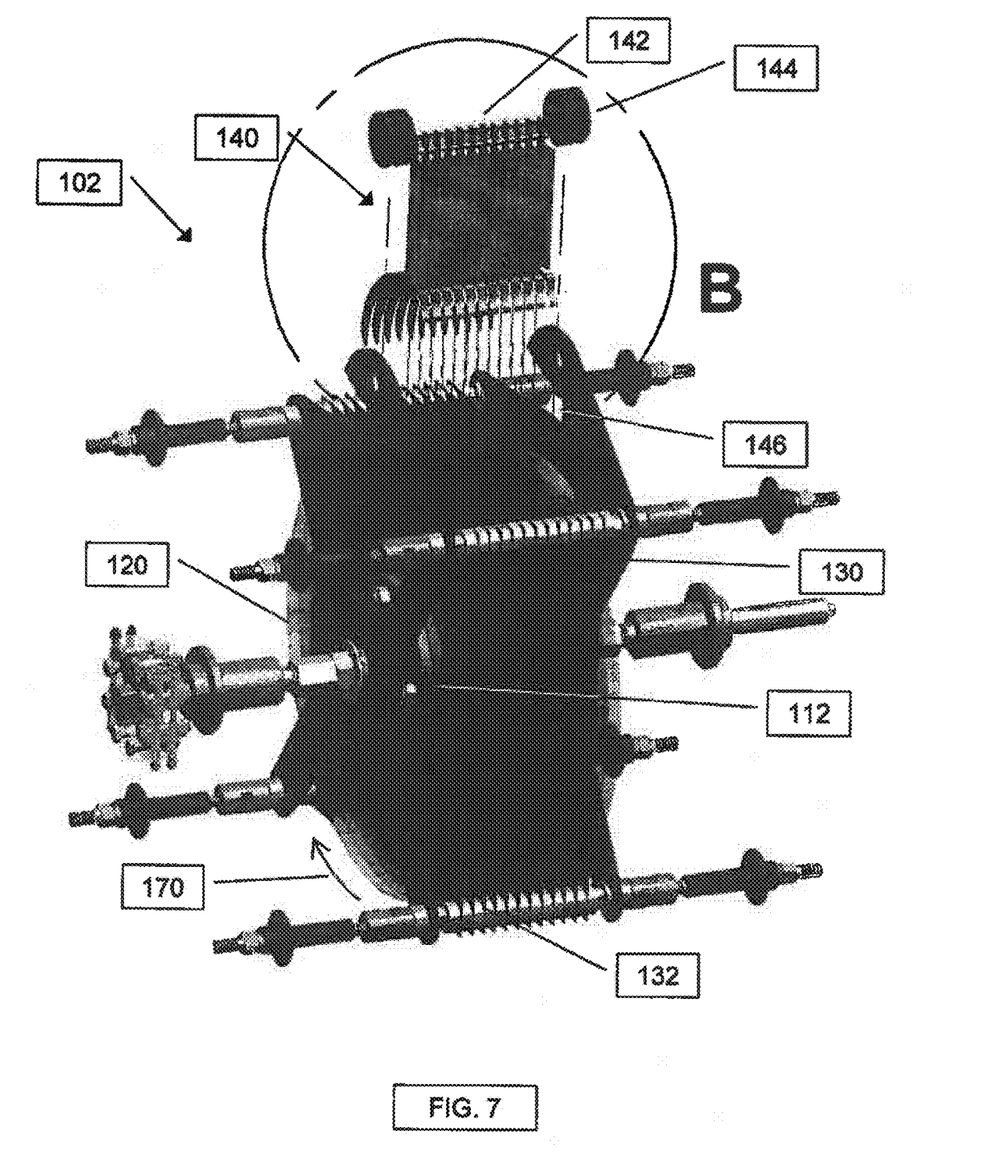
FIG. 7 is transparent isometric view of a second preferred embodiment of a system for the electrolysis of water constructed and operational according to the teaching of the present invention, shown here with the cleaning elements exploded out from the main body.
Figure 8:
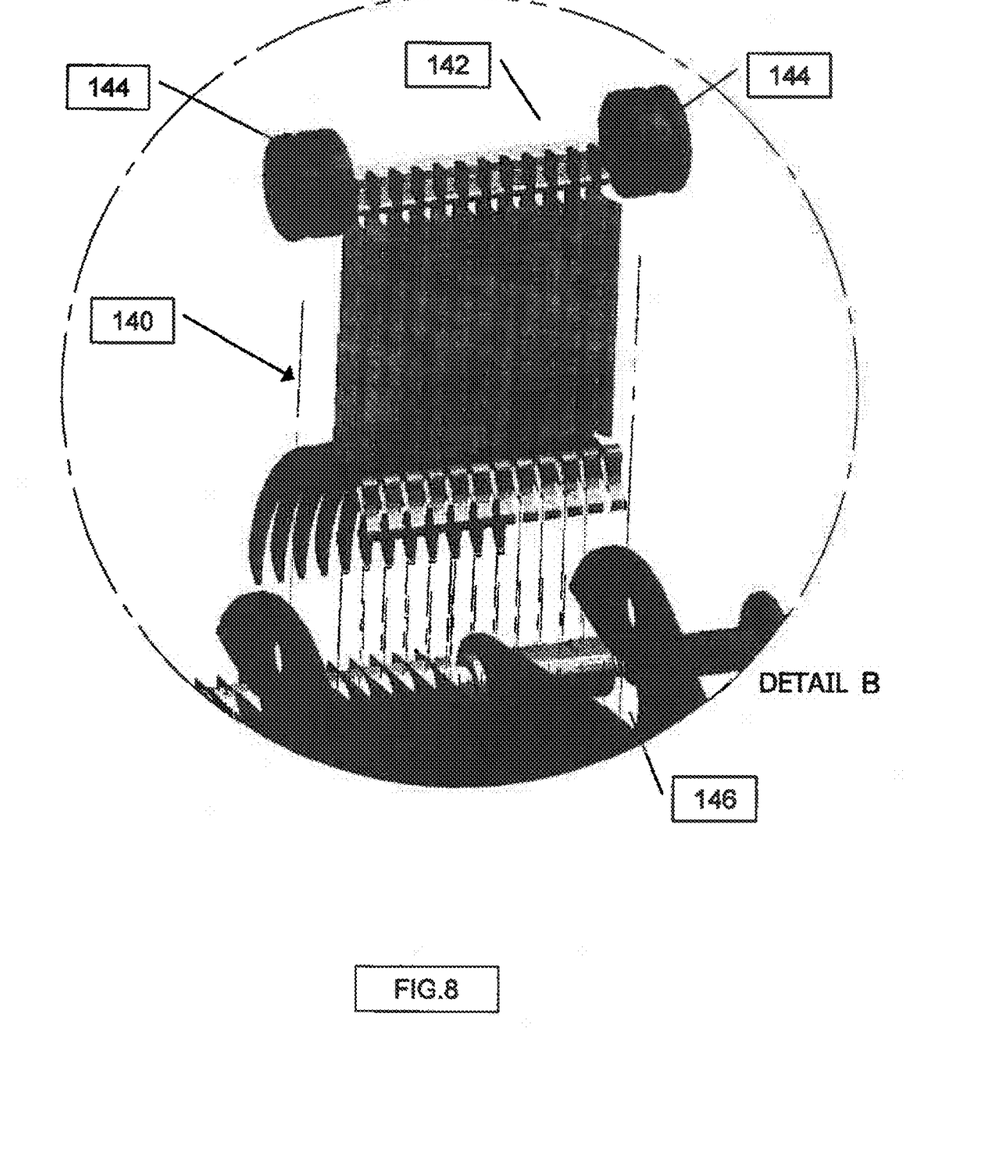
FIG. 8 is detail B of FIG. 7.
Figure 9:
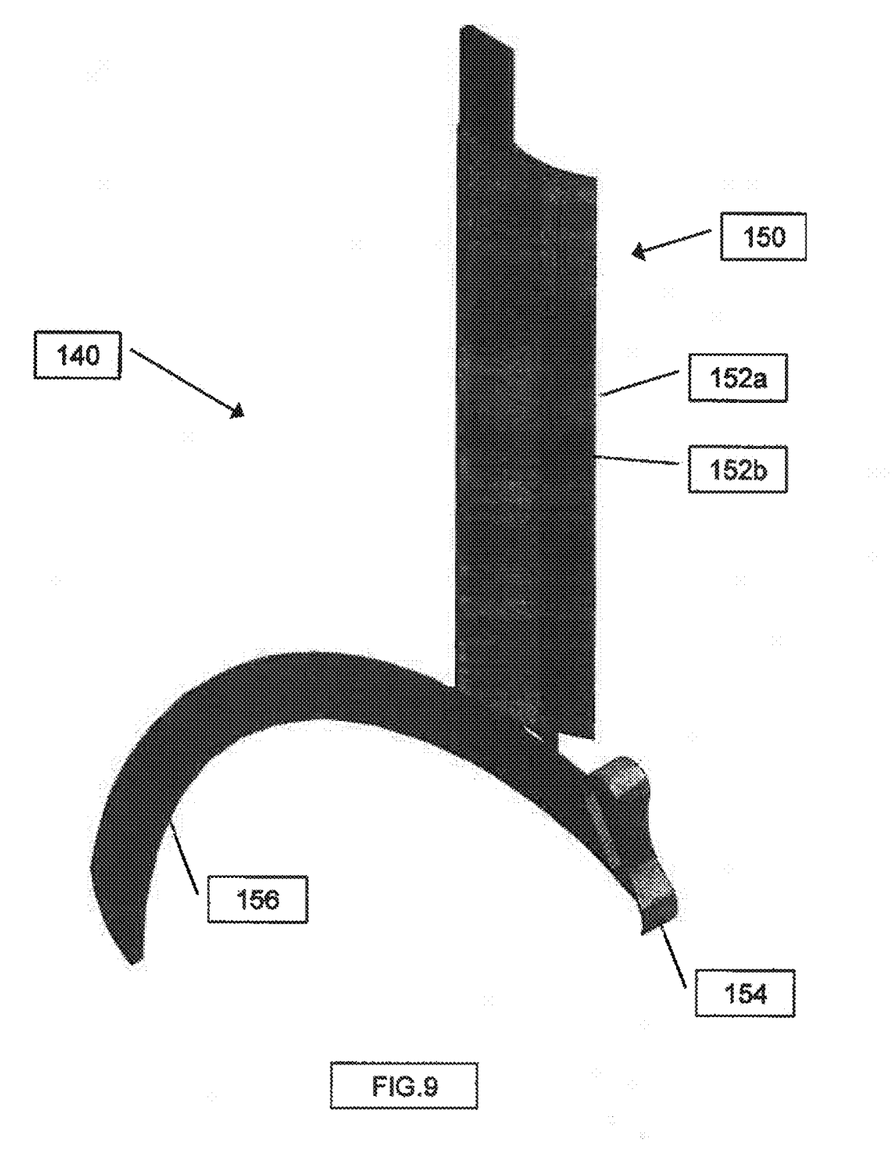
FIG. 9 is an isometric view of a single cleaning element of the embodiment of FIG. 7.

A second preferred embodiment 102 of a system for the electrolysis of water constructed and operational according to the teaching of the present invention is illustrated in FIGS. 7-9. It will be appreciated that the general operation of this embodiment in FIGS. 7-9 is basically the same as the operation of the embodiment of FIGS. 1-6, especially with regard to the operation of the stationary anodes 132 and the rotating cathodes 120.

FIGS. 7-9 are brought to illustrate variations to some of the elements described above.

Most notably are the cathode cleaning elements 140, a plurality of which is best seen in FIG. 8 and individually in FIG. 9.

As illustrated here, the plurality of cathode cleaning elements 140 are connected to frame cross-bar element 142, which in turn is releasably attached to frame 130 by means of connectors 144 and connection notches 146.

As with the cathode cleaning elements 40 described above, cathode cleaning elements 140 are deployed one cathode cleaning elements is deployed between each of the plurality of the rotating cathodes 120 extending from frame cross-bar element 142 to a point adjacent to the axle 112 so as to span at least the distance substantially from to the axle 112 to the edge of the rotating cathode disc 120.

As best seen in FIG. 9, cathode cleaning element 140 is configured as a scraper. Scraping elements 150 are outwardly biased such that scraping edges 152a and 152b contact the surfaces of both of the rotating cathodes 120 they lie between. It will be readily understood that scraping elements 150 may be configured as a single unit or as a plurality of units deployed as a group.

The cathode cleaning element 140 also includes an axle cleaner illustrated here as an axle scraper 154 configured to engage the surface of the axle 112 extending between the rotating cathode disc 120.

Arrow 170 indicates the direction of rotation of the rotating cathode discs 120 and it will be appreciated, therefore, that the force of such rotation against the cathode cleaning elements 140 would tend to push the cathode cleaning elements 140 out of alignment To prevent such misalignment from occurring, the cathode cleaning elements 140 are configured with a support extension 156. The curvature of support extension 156 substantially corresponds to the curvature of the circumference of axle 112. Therefore, it will be understood that during operation of the system 102, as the rotating cathode discs 120 rotate, support extension 156 rides on the surface of the axle 112, thereby maintaining proper alignment of cathode cleaning element 140 and scraping elements 150.

It should be understood that, as mentioned above, it is common in the systems currently in use for polarity of the "cathodes" and the "anodes", to be intermittently switched such that the cathodes become anodes and the anodes become cathodes and the change is repeated. Since this practice shows that in electrolysis systems which elements are cathodes and which are anodes may be considered a design option. Therefore, with that in mind, it will be appreciated that while the electrolysis system of the present invention is described herein as having rotating cathodes and stationary anodes, this is not intended as a limitation, but rather as an example of a preferred embodiment. Therefore, an embodiment having rotating anodes and stationary cathodes is within the scope of the present invention.

It will be appreciated that the above descriptions are intended only to serve as examples and that many other embodiments are possible within the spirit and the scope of the present invention.

What is claimed is:

1. An electrolysis mechanism for deployment in a tank containing water, the electrolysis mechanism comprising:
   (a) a stationary frame deployed within the tank;
   (b) an axle rotatably mounted on said stationary frame, said axle having at least one rotating cathode mounted there upon, said axle configured to rotate during an electrolysis process;
   (c) a frame cross-bar element deployed on said stationary frame above and parallel to said axle, and said frame cross-bar element being configured so as to be releasably attached to said stationary frame such that said frame cross-bar element is removable from said stationary frame while said stationary frame remains in the tank;
   (d) at least one stationary cathode cleaning element extending downwardly from said frame cross-bar element so as to contact a face of said at least one rotating cathode such that, during said electrolysis process as said at least one rotating cathode rotates, scale buildup on said at least one rotating cathode is removed, wherein said at least one stationary cathode cleaning element is outwardly biased such that a scraping edge of said at least one stationary cathode cleaning element contacts said face of said at least one rotating cathode and said at least one stationary cathode cleaning element is configured with a support extension, wherein a curvature of said support extension substantially corresponds to a curvature of a circumference of said axle such that said support extension rides on a surface of said axle in a non-attached relationship, thereby maintaining proper alignment of said at least one stationary cathode cleaning element and said scraping edge; and
   (e) at least one stationary anode deployed on said stationary frame adjacent to said at least one rotating cathode.

2. The electrolysis mechanism of claim 1, wherein:
   (a) said at least one rotating cathode is configured as a plurality of spaced apart rotating cathodes;
   (b) said at least one stationary cathode cleaning element is configured as a plurality of stationary cathode cleaning elements equal in number to the number of spaces between said plurality of rotating cathodes such that one of said plurality of stationary cathode cleaning elements is deployed in each of said spaces between said plurality of rotating cathodes so as to contact a face of each of said plurality of rotating cathodes said one of said plurality of stationary cathode cleaning element is deployed between, wherein each of said plurality of stationary cathode cleaning elements is outwardly biased such that scraping edges of each of said plurality of stationary cathode cleaning elements contact said faces of two of said plurality of rotating cathodes each of said stationary cathode cleaning element is deployed between; and
   (c) said at least one stationary anode is configured as a plurality of stationary anodes at least equal in number to the number of said spaces between said plurality of rotating cathodes such that one of said plurality of stationary anodes is deployed in each of said spaces between said plurality of said rotating cathodes.

3. The electrolysis mechanism of claim 2, wherein each one of said plurality of stationary cathode cleaning elements is deployed so as to extend from a point adjacent to said axle to at least an edge of each of said rotating cathodes said one stationary cathode cleaning element is deployed between.

4. The electrolysis mechanism of claim 3, wherein each one of said plurality of stationary cathode cleaning elements is configured as one from a list that includes: substantially soft, substantially abrasive and a scraping element.

5. The electrolysis mechanism of claim 1, wherein said at least one rotating cathode is configured substantially as a disc.

6. The electrolysis mechanism of claim 1, wherein said frame cross-bar element is configured with connectors and said support frame is configured with corresponding connection notches.

7. The electrolysis mechanism of claim 1, wherein at least one stationary cathode cleaning element extends perpendicular to said frame cross-bar element.

8. A method for automated cathode cleaning in an electrolysis system having at least one rotating cathode and at least one stationary anode, the method comprising:
   (a) deploying the electrolysis mechanism of claim 1 in a tank containing water;
   (b) operating the electrolysis system thereby causing said at least one rotating cathode to rotate while performing an electrolysis process;
   (c) removing scale buildup on said at least one rotating cathode by means of said at least one stationary cathode cleaning element as said at least one rotating cathode rotates; and
   (d) removing said frame cross-bar element, with said at least one stationary cathode cleaning element attached there upon, from said stationary frame while said stationary frame remains in said tank.

9. The method of claim 8, wherein the at least one rotating cathodes is implemented as a plurality of spaced apart rotating cathodes and the at least one stationary anode in implemented as a plurality of stationary anodes, such that said deploying at least one stationary cathode cleaning element is implemented as deploying a plurality of stationary cathode cleaning elements equal in number to the number of spaces between said rotating cathodes such that one of stationary cathode cleaning element is deployed in each of said spaces between said rotating cathodes so as to contact a face of each of said rotating cathodes said one stationary cathode cleaning element is deployed between, wherein each said stationary cathode cleaning element is outwardly biased such that scraping edges of said stationary cathode cleaning element contact said faces of both said rotating cathodes said stationary cathode cleaning element is deployed between.

* * * * *